United States Patent
Michel et al.

(10) Patent No.: US 7,500,497 B2
(45) Date of Patent: *Mar. 10, 2009

(54) METHOD OF FILLING COMPRESSED-GAS CONTAINERS WITH GAS

(75) Inventors: Friedel Michel, Erkrath (DE); Ulrich Klebe, Kerken/Aldekerk (DE)

(73) Assignee: L'Air Liquide, Societe Anonyme pour l'etude et l'Exploitation des Procedes Georges Claude, Paris Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/583,131

(22) PCT Filed: Dec. 10, 2004

(86) PCT No.: PCT/EP2004/053405

§ 371 (c)(1),
(2), (4) Date: May 11, 2007

(87) PCT Pub. No.: WO2005/059431

PCT Pub. Date: Jun. 30, 2005

(65) Prior Publication Data

US 2007/0246121 A1   Oct. 25, 2007

(30) Foreign Application Priority Data

Dec. 19, 2003   (DE) ............................ 103 60 591

(51) Int. Cl.
*B65B 1/04*   (2006.01)

(52) U.S. Cl. ................ 141/2; 141/11; 141/82; 141/95

(58) Field of Classification Search .............. 141/82, 141/2, 11, 69, 95; 137/334; 53/403, 440
See application file for complete search history.

(56) References Cited

U.S. PATENT DOCUMENTS

| | | | | |
|---|---|---|---|---|
| 4,715,786 A * | 12/1987 | Wolff et al. | ............ | 417/22 |
| 4,922,973 A * | 5/1990 | Keneavy | ............ | 141/4 |
| 5,022,442 A * | 6/1991 | Bird | ............ | 141/100 |
| 5,101,637 A | 4/1992 | Daily et al. | | |
| 5,837,027 A | 11/1998 | Olander et al. | | |
| 5,900,538 A | 5/1999 | Bastian | ............ | 73/49.2 |
| 6,032,665 A * | 3/2000 | Psaros | ............ | 128/203.12 |
| 6,726,241 B2 * | 4/2004 | Welz | ............ | 280/737 |
| 2007/0017597 A1* | 1/2007 | Klebe et al. | ............ | 141/82 |
| 2008/0016884 A1* | 1/2008 | Kesten et al. | ............ | 62/47.1 |

FOREIGN PATENT DOCUMENTS

| | | |
|---|---|---|
| DE | 198 17 324 A1 | 10/1999 |
| DE | 101 07 895 A1 | 9/2002 |
| GB | 1 450 166 A | 9/1976 |
| JP | 63-013999 | 1/1988 |

* cited by examiner

*Primary Examiner*—Timothy L Maust
*Assistant Examiner*—Jason K Niesz
(74) *Attorney, Agent, or Firm*—Young & Thompson

(57) ABSTRACT

A method for filling a compressed-gas container, in particular a compressed gas container in an airbag system, with a gas or gas mixture, or for producing a gas mixture in a compressed gas container. The filling is accomplished by introducing a gas mixture, or at least one gaseous component of the gas mixture, into a cooled compressed-gas container in the form of a gas or liquid-cooled gas.

18 Claims, 2 Drawing Sheets

US 7,500,497 B2

METHOD OF FILLING COMPRESSED-GAS CONTAINERS WITH GAS

BACKGROUND OF THE INVENTION

1. Field of the Invention

Figure 1:
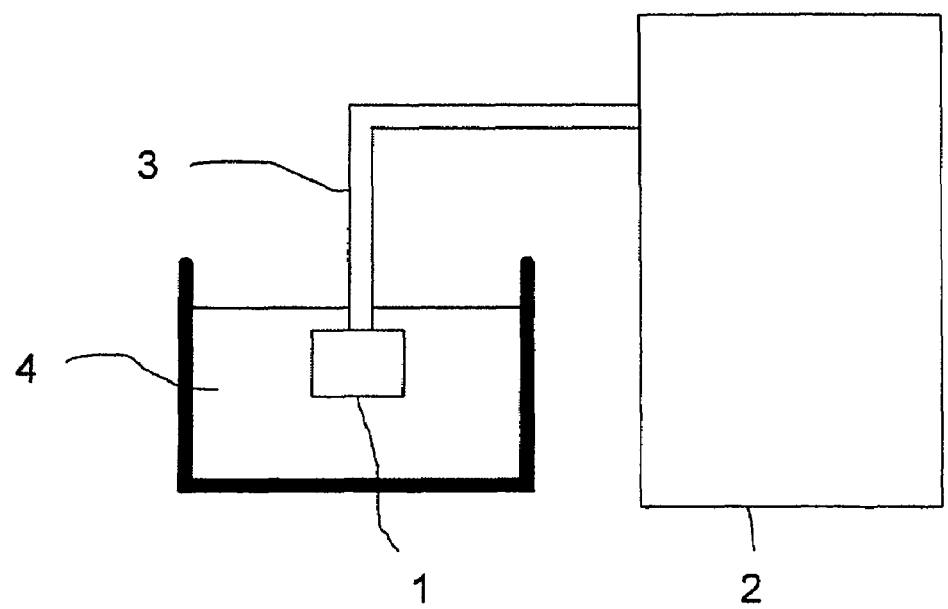

The invention relates to a method for filling compressed-gas containers, in particular in airbag systems, with a gas mixture.

2. Description of the Related Art

Vehicle airbags are increasingly using new types of gas generators, which in the event of an accident inflate the airbag within a few milliseconds. At present, three types of gas generators are in use:

- chemical generators, in which the gas is generated by the reaction of a chemical solid with ambient air;
- what are known as hybrid generators, which comprise a combination of solid fuel and compressed-gas packing, and
- pure gas generators with a high-pressure gas storage system at pressures of up to 700 bar at 15° C.

The gas generators, which are filled with various gases, cause huge technical problems in production, both in terms of their production and in terms of filling at pressures of up to 1000 bar. These pressures are required in particular for rapid filling, on account of the heat of compression, in order to introduce the precisely predetermined gas masses. These are of crucial importance to the subsequent inflation characteristics of the airbag.

Examples of gases used include argon, oxygen, nitrogen, dinitrogen monoxide (laughing gas, nitrous oxide), both in the form of ultra-pure gases and in the form of gas mixtures of these components.

Gas-filled gas generators require:

1. Filling pressures of up to 1000 bar (P(T)) for higher storage density or more compact dimensions.
2. Accurate and exact filling quantity determination at high pressures.
3. Rapid filling, since it is the filling which determines the cycle times.
4. The operation must be highly reproducible.

Very expensive and complicated piston or diaphragm compressors are required in order to generate the very high pressures. This entails high investment costs, high operating and maintenance costs. In addition, a downstream gas supply which is correspondingly complex and expensive is required for these pressures.

With increasing pressures, on account of the heat of compression and the uneven temperature distribution in the pressure vessel, the inaccuracy of the precise filling quantity determination increases, yet this accuracy is imperative for the generator to subsequently function as defined.

With increasing pressures, it becomes technically more difficult and complex to achieve fast filling times. There is a direct relationship between filling time and warming during the filling operation, i.e. the more quickly the filling is carried out, the more the gas temperature rises, with the result that the filling pressure has to be increased still further in order to achieve the exact quantity of gas for 15° C. or another defined temperature.

For the abovementioned reasons, the reproducibility is becoming more difficult and entails complex QA measures, such as for example weighing of the filled vessels for accurate filling quantity determinations. At the same time, a considerable rise in the scrap rate is expected at higher pressures. This in turn leads to an adverse effect on the economics of the overall process and therefore to higher production costs.

SUMMARY OF THE INVENTION

The invention is based on the object of providing an alternative method for the high-pressure gas filling of pressure vessels, in particular of airbag gas generators, with a gas mixture.

The method for filling a compressed-gas container, in particular a pressure vessel in an airbag system, with a gas mixture is characterized by the filling of the compressed-gas container at a temperature at which at least one gas component of the gas mixture or of the gas mixture to be produced condenses in the compressed-gas container or passes into the compressed-gas container as a liquid phase. The gas mixture which has been introduced or is to be produced in the compressed-gas container is advantageously used to produce a compressed-gas source, in particular to fill a compressed-gas container with a gas mixture at high pressure (pressures in the compressed-gas container for example over 50 bar absolute, preferably over 100 bar, particularly preferably over 200 bar, in particular over 250 bar). The method is characterized by the simultaneous or successive introduction of the gas components of a gas mixture in gaseous or liquid phase into a cooled compressed-gas container which is at a temperature corresponding to the boiling temperature of a gas component or to a temperature below this boiling temperature (referred to as the refrigeration), closing the compressed-gas container in the refrigeration. The pressure, in particular a high pressure, in the filled and closed compressed-gas container is generally produced by warming.

BRIEF DESCRIPTION OF THE DRAWING FIGURES

The invention, methods with cold filling, is explained on the basis of the simplified example of the introduction of a single-component gas on the basis of the drawings, in which:

FIG. 1 shows a highly simplified diagram of a filling device for pressure vessels.

Figure 2:
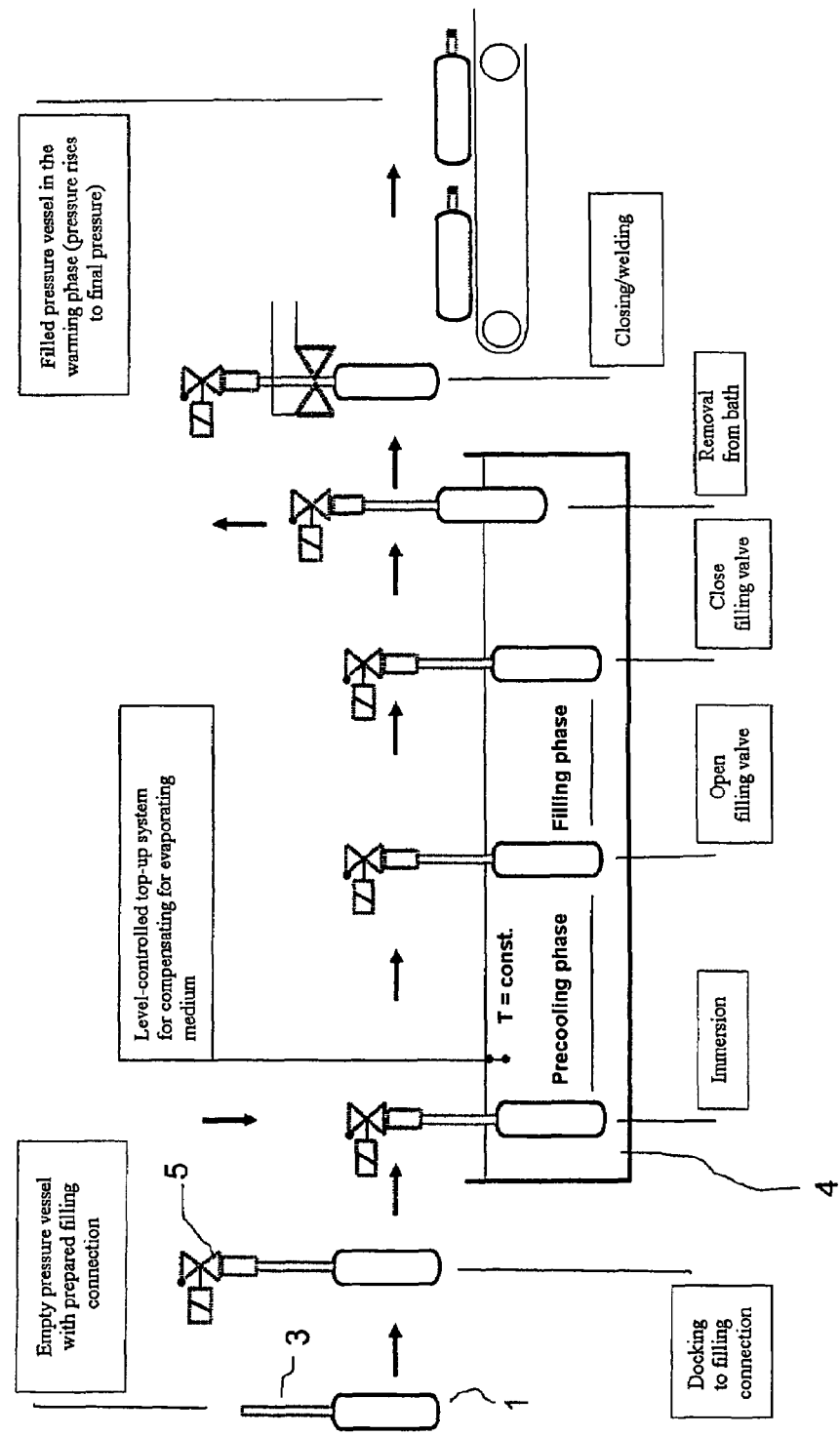

FIG. 2 diagrammatically depicts, as an example, the various stages of a filling process for pressure vessels.

DETAILED DESCRIPTION OF THE PREFERRED EMBODIMENTS

In the method, compressed-gas containers are filled with a gas mixture (based on room temperature and standard pressure), for example by filling the compressed-gas container with a cooled gaseous gas mixture, filling the compressed-gas container with a cooled liquid (e.g. cryogenically liquefied) gas mixture or filling the compressed-gas container with at least one cooled gaseous gas or gas mixture and at least one cooled liquid gas or gas mixture.

The compressed-gas container corresponds, for example, to a pressure vessel in standard gas generators for airbag systems. Compressed-gas containers are also compressed-gas cylinders, pressure canisters, pressure cartridges, ultrasmall compressed-gas cylinders.

The compressed-gas container is, for example, a pressure vessel which forms part of a gas generator of an airbag system. The pressure vessel is for example also an independent part, such as a pressure cartridge, an ultrasmall compressed-gas container or a relatively small compressed-gas container. The pressure vessel is preferably a compressed-gas vessel suitable for cryogenic applications, which is able to withstand the sudden, local temperature changes between ambient temperature and the filling temperature, for example down to −250° C., caused by the cryogenic filling operation and safely encloses the filling gas after the rise in temperature at the resulting storage pressures. Suitable materials for the pressure vessels include, for example, the standardized, metastable austenitic CrNi steels, in particular of grades 1.4301, 1.4307, 1.4306, 1.4541.

In the method, the compressed-gas container or pressure vessel, for example a chamber that is to be filled in a gas generator of an airbag system, is connected for example to a compressed-gas source for the filling gas (e.g. a gas which is a component of a gas mixture to be produced, or a gaseous gas mixture). This connection is generally made via a gas conduit. The compressed-gas source is, for example, a compressed-gas container, in particular a compressed-gas cylinder, or a high-pressure gas supply. After the filling chamber has been connected to the compressed-gas source, the walls of the compressed-gas container to be filled are cooled to the filling temperature. The filling temperature is generally below 0° C., preferably below −50° C. and particularly preferably below −100° C., and is in particular a temperature of below −150° C. It is advantageous for the filling to be carried out at the temperature of cryogenically liquefied hydrogen (−253° C.), cryogenically liquefied nitrogen (−196° C.), cryogenically liquefied oxygen (−183° C.), cryogenically liquefied argon (−186° C.) or dry ice (−78.5° C.), depending on the type of filling gas and the desired filling pressure to be produced. The cooling of the pressure vessel preferably takes place at a constant temperature. The cooling is effected, for example, by means of a refrigeration bath or immersion bath containing a cooling liquid (e.g. cryogenically liquefied gases), a cooling block (e.g. a cooled metal block), a cold gas (e.g. the use of a gas tunnel), cold solid particles (e.g. cooled metal balls, dry ice particles), a cold solid (e.g. dry ice) or a thermostated cooling device. By way of example, the cooling takes place in an immersion bath containing a refrigerant, such as cryogenically liquefied nitrogen (LN2). A refrigeration bath containing a cryogenically liquefied gas or dry ice offers the advantage of refrigeration consistency.

It is particularly advantageous to use a cryogenically liquefied gas (e.g. LN2) as refrigerant in a refrigeration bath:

At the boiling point, the temperature is dependent only on the pressure, i.e. is accurately defined for example at constant ambient pressure.

On account of the good heat transfer in the boiling liquid, the container and its contents are quickly likewise brought to precisely the boiling point.

The filling pressure to achieve the required filling quantity is drastically reduced compared to a conventional filling method, for example to 20-25%, i.e. by a factor of 4 to 5; for gas mixtures which also contain lower-boiling gas components (based on the filling temperature), it is still possible to achieve a significantly greater pressure reduction depending on the level of these components.

The gas or gas mixture which is to be stored advantageously enters the pressure vessel in the cryogenic, gaseous state (e.g. by cooling in the pressure vessel or by cooling upstream of the pressure vessel). The pressure vessel is advantageously evacuated prior to the filling operation. For the filling operation to be carried out, a connection is produced between the cooled pressure vessel and the uncooled compressed-gas source, and a defined pressure is set. The compressed-gas source (e.g. a compressed-gas source comprising the gas or gas mixture) is generally at a temperature in the range from 0° C. to 100° C. The compressed-gas source is, for example, at ambient temperature, in particular room temperature (15 to 30° C.). During the filling of the pressure vessel, the temperatures of pressure vessel and compressed-gas source preferably differ by at least 50° C., particularly preferably by at least 100° C., in particular by at least 150° C. The temperatures of the gas or gas mixture in the pressure vessel and the compressed-gas source preferably differ by at least 50° C., particularly preferably by at least 100° C., in particular by at least 150° C.

The pressure which is set or present, i.e. the pressure in the cooled pressure vessel (primary filling pressure), is generally in the range from over 1 bar to 400 bar absolute, preferably in the range from 10 bar to 300 bar absolute, particularly preferably in the range from 50 bar to 150 bar absolute, in particular in the range from 70 bar to 100 bar absolute.

The filling temperature (cooling temperature) of the pressure vessel is preferably selected in such a way that the filling temperature is above the boiling point of the gas which is introduced or the boiling point of the highest-boiling gas component of the gas mixture which is introduced, so that no condensation of the gas takes place in the pressure vessel. This allows manometric monitoring of the filling and manometric determination of the filling quantity.

After the cooled pressure vessel has been filled, it is closed and the pressure vessel containing the gas which has been introduced is warmed. It is generally warmed to the subsequent temperature of use (ambient temperature or room temperature). The warming is effected, for example, by removing the cooling source (e.g. by removing the filled pressure vessel from a refrigeration bath). Therefore, the warming to ambient temperature takes place for example by heat exchange with the environment. Alternatively, the warming is effected by active heating.

The final filling pressure or secondary filling pressure (equilibrium pressure) after warming is set to the desired temperature, generally ambient temperature. The final filling pressure is determined by the quantity of gas introduced.

During the filling of the compressed-gas container, to produce a compressed-gas source it is advantageous to produce or use gas mixtures which contain at least one gas component which is present as a gas at the filling temperature, and contain at least one gas component which is present in the form of a liquid at the filling temperature.

Table 1 lists examples of suitable filling temperatures for various gas mixtures or gas mixtures that are to be produced.

TABLE 1

Examples of gases and filling temperatures

| Gas mixture | Filling temperature/° C.; refrigerant (liquid or solid) | | | | |
|---|---|---|---|---|---|
| He/Ar; He/N$_2$; He/CO$_2$; He/N$_2$O; | −253° C.; H$_2$ | −196° C.; N$_2$ | −186° C.; Ar | −183° C., O$_2$ | −78° C.; CO$_2$ |
| H$_2$/Ar; H$_2$/N$_2$; H$_2$/CO$_2$; H2/N$_2$O; | −253° C.; H$_2$ | −196° C.; N$_2$ | −186° C.; Ar | −183° C., O$_2$ | −78° C.; CO$_2$ |
| N$_2$/Ar; N$_2$/CO$_2$; H$_2$/N$_2$O; | −253° C.; H$_2$ | −196° C.; N$_2$ | −186° C.; Ar | −183° C., O$_2$ | −78° C.; CO$_2$ |
| Ar/He/O$_2$, 77:3:20 Vol.-% | −253° C.; H$_2$ | −196° C.; N$_2$ | −186° C.; Ar | −183° C., O$_2$ | −78° C.; CO$_2$ |
| N2/He/O$_2$, 77:3:20 Vol.-% | −253° C.; H$_2$ | −196° C.; N$_2$ | −186° C.; Ar | −183° C., O$_2$ | −78° C.; CO$_2$ |

Depending on how much gas is supplied, it is thus possible to realize very high storage pressures, in particular even over 300 bar, without major technical and energy outlay.

Method for Producing Gas Mixtures or for Filling Compressed-Gas Containers with a Gas Mixture (Cold Filling Method)

a) Manometric Filling with Gas Mixture With Gas Component which Condenses as Liquid at the Filling Temperature Compressed-gas containers (e.g. gas generators for airbags) containing gas mixtures comprising at least one higher-boiling component (based on the filling temperature) and at least one lower-boiling component (based on the filling temperature) are particularly advantageous.

EXAMPLE helium/argon gas mixture or helium/oxygen gas mixture, filling at −196° C. (liquid nitrogen bath). Helium serves as the lower-boiling component (based on the filling temperature of −196° C.), argon or oxygen as higher-boiling component (based on the filling temperature of −196° C.). This means that when the compressed-gas container, which has been cooled to −196° C. in the liquid nitrogen bath, is being filled with the gaseous gas mixture comprising helium/argon gas mixture or helium/oxygen gas mixture, helium remains in gas form in the compressed-gas container, whereas argon or oxygen condenses.

The method involving introducing gas mixtures of this type is particularly advantageous for the production of a compressed-gas source:

If a gas mixture comprising two components, e.g. argon and helium, e.g. at LN2 temperature (LN2: cryogenically liquefied nitrogen, liquid nitrogen) is introduced, argon will condense out and even change to the solid state, whereas helium remains in gas form. This results in additional potential for reducing pressure compared to pure helium filling at LN2 temperature, and this potential increases further as the proportion of argon in the mixture increases. This means that as a result of the "reduced pressure" during the filling of the compressed-gas container at the filling temperature, at a given filling pressure a higher final pressure is obtained in the compressed-gas container at room temperature.

There now follows a further explanation of the method. After the compressed-gas container has been immersed in the refrigeration bath, the gas mixture which is to be introduced is passed into the container via a gas supply system from a compressed-gas reservoir or by means of a compressor. The gas mixture, e.g. helium/argon, in the process quickly adopts the temperature of the surface of the compressed-gas container and therefore the filling temperature (e.g. boiling temperature of nitrogen if a liquid nitrogen bath is used). The heat of compression is dissipated through the container to the refrigeration bath. The corresponding density, which is of course significantly higher than at room temperature, is established.

The filling pressure is principally determined by the lower-boiling component, since the higher-boiling component is liquefied or even solidifies, so that its partial pressure moves towards "zero".

In this example, the helium performs the role, as it were, of a "primary gas", since its partial pressure is the determining factor.

The required filling mass for the boiling temperature can therefore be accurately and reproducibly set in a simple way on the basis of the filling pressure of the "primary gas" (manometrically controlled filling). The filling quantity in the compressed-gas container is therefore determined on the basis of the filling pressure of the gaseous gas component which does not condense. The error in the manometric filling quantity determination by condensing gas components in the compressed-gas container can be determined for example empirically and then corrected.

Then, the container is closed under pressure using suitable means.

b) Manometric Filling with Gas Mixture Comprising a Gas Component which Condenses as a Solid at the Filling Temperature Implementation of the method as under a).

EXAMPLE helium/carbon dioxide gas mixture, filling at −196° C. (liquid nitrogen bath).

c) Successive Manometric Filling with Gas Components which are Present in Gas form at the Filling Temperature The gas mixtures are produced in/introduced into the cold container manometrically by stepwise manometric metering of the desired partial pressures of the gas components.

The production of gas mixtures by means of a manometric filling method has been described in DE 197 04 868 C1, to which reference is hereby made. The method involving filling a cooled pressurized container can be carried out analogously.

EXAMPLE 1. helium/argon gas mixture, filling at −78° C. (dry ice cooling);
2. helium/nitrogen gas mixture, filling at −183° C. (argon refrigeration bath).

d) Volumetric Filling with Gas Mixture which is Present in the Form of a Liquid at the Filling Temperature The liquid gas mixture is metered into the compressed-gas container as a liquid, with the quantity being introduced for example into a metering container with a known volume and having been cooled to the filling temperature or below or a "measurement section" which can be closed off by valves, e.g. a through-flow container arranged in the filling line. The volumetric determination of the liquid quantity is advantageously carried out using sufficiently accurate devices for measuring the through-flow (e.g. through-flow sensor).

e) Successive Volumetric Filling with Gas Components which are in Liquid Form at the Filling Temperature The gas components of the gas mixture are metered individually in succession into the compressed-gas container in liquid form, with the quantities being introduced, for example, into a metering container with a known volume which has been cooled to the filling temperature or below, or a "measurement section" which can be closed off by valves, for example a through-flow container arranged in the filling line. The volumetric determination of the liquid quantity is advantageously carried out using sufficiently accurate devices for measuring the through-flow (e.g. through-flow sensor).

EXAMPLE oxygen/argon gas mixture, filling at −196° C. (liquid nitrogen bath).

f) Introducing a Gas Mixture Via Upstream Measurement Gas Container

At a defined temperature, preferably ambient temperature, the gaseous gas mixture which has previously been produced is introduced at low pressure (40 to 200 bar) into an upstream container with an accurately defined volume.

The gas source used may be a medium-pressure reservoir, bundle, etc. or a mixture which has been produced volumetrically from the individual gas components and is compressed using a compressor.

The measurement container is connected, via a suitable configuration of valves (pneumatic valves for automation), to the container, which is immersed in the low-boiling liquid, via a releasable connection. The volume of the compressed-gas container to be filled is smaller by a factor F than the gas measurement container.

In accordance with the principle described above, the gas mixture is introduced at the defined boiling temperature by pressure compensation and by means of the cold surface of the container. The complete gas quantity of the measurement gas container, which has previously been determined from the state variables, is then introduced at a significantly higher density.

Next, the container is removed from the refrigeration bath and warmed. A corresponding pressure rise by the factor X is likewise established. It is in this way possible for gas mixtures with boiling temperatures higher than the filling temperature to be introduced accurately and in a defined way at low pressures. The advantages stated above apply accordingly. The quantitative determination is effected by means of the measurement gas container.

The production of gas mixtures by means of a measurement gas container is described in DE 197 44 559 C2, to which reference is hereby made. The method involving filling a cooled pressure container can be carried out analogously.

The Advantages of the Method with Cold Filling:
  The filling can be carried out using significantly lower working pressures.
  There is no need for ultra-high-pressure compressors; standard components can be used.
    Correspondingly more economical, lower maintenance and operating costs
  Reproducible and accurate.
  Low scrap rates.
  High efficiency, for example when using helium, low losses
    Correspondingly more economical
  Less complex quality assurance, or even the possibility of complete elimination of quality assurance.
  The process is fast and is highly suitable for automation.

The filling device shown in FIG. 1 has a pressure vessel 1 that is to be filled, a compressed-gas source 2, e.g. a compressed-gas cylinder (filling pressure for example 300 bar) containing helium or hydrogen with shut-off valve and pressure reducer, a gas connecting conduit 3 and a refrigeration bath 4 containing a cryogenically liquefied gas, such as liquid nitrogen, as refrigerant. The pressure vessel 1 is, for example, part of a gas generator of an airbag system or a gas cartridge.

After the pressure vessel 1 has been immersed in the refrigeration bath 4, the gas with which it is to be filled is introduced from the compressed-gas source 2 into the pressure vessel 1 by setting a desired pressure (e.g. 90 bar absolute; set at the pressure reducer of the compressed-gas cylinder). The gas, for example helium or hydrogen, in the process rapidly adopts the temperature of the surface and therefore the boiling point of the refrigerant. The gas is cooled in the pressure vessel 1 to the temperature of the refrigeration bath. The boiling point of the gas is below the temperature of the refrigeration bath, so that no condensation of the gas occurs in the pressure vessel 1. A density which corresponds to the temperature and is therefore considerably higher than at room temperature is established. The required filling mass of the gas can easily be set accurately and reproducibly by means of the filling pressure, given the constant temperature of the refrigeration bath. Then, the pressure vessel 1 is closed under pressure using suitable means. The pressure vessel 1 is closed, for example, at the filling tube (gas feed line 3), which is pinched or welded closed immediately after the temperature compensation at the filling temperature. Then, the vessel is removed from the refrigeration bath and warmed.

The increase in temperature (warming) generates an increase in pressure (by approx. 3.7 times in the case of helium, approx. 5 times in the case of $H_2$ for a temperature rise from 77 to 288 K). It is possible, for example, to generate filling pressures of 700 bar or 1000 bar (at room temperature).

FIG. 2 illustrates steps involved in the gas filling of pressure vessels 1. During the filling operation, the pressure vessel is connected to the compressed-gas source 2 (not shown). The connection is made via a connection of the filling line to the shut-off valve 5.

The invention claimed is:

1. A method for filling a compressed-gas container in an airbag system, with a gas mixture or for producing a gas mixture in the compressed-gas container, comprising:
  introducing a gas mixture as cryogenically liquefied gas or at least one gas component of the gas mixture as cryogenically liquefied gas into a cooled compressed-gas container, while the compressed-gas container is moving through a cooling bath, whereby determination and monitoring of the filing quantity during the filling of the compressed-gas container with the cryogenically liquefied gas or a cryogenically liquefied gas mixture are carried out gravimetrically or volumetrically.

2. The method as claimed in claim 1, wherein a pressure is generated in the filled and closed compressed-gas container by warming after the compressed-gas container is removed from the cooling bath.

3. The method as claimed in claim 1, wherein after removal of the compressed gas container from the cooling bath, the warming is effected by active heating or by temperature compensation to room temperature, ambient temperature or a temperature above 0° C.

4. The method as claimed in claim 1, wherein the filling of the compressed-gas container takes place at a refrigeration temperature of at least −50° C. or below.

5. The method as claimed in claim 1, wherein the filling of the compressed-gas container takes place at a constant or substantially constant temperature.

6. The method as claimed in claim 1, wherein the introduction of cryogenically liquefied gas or cryogenically liquefied gas mixture into the compressed-gas container is effected by condensation of a gas in the cooled compressed-gas container.

7. The method as claimed in claim 1, wherein the compressed-gas container is filled with a gaseous gas or gas mixture by filling with at least one gaseous gas mixture that has previously been produced or by successive filling with a gaseous gas or by successive filling with at least one gaseous gas and at least one gaseous gas mixture.

8. The method as claimed in claim 1, wherein the filling of the compressed-gas container with a gas or gas mixture takes place under pressure.

9. The method as claimed in claim 2, wherein the warming is effected by active heating or by temperature compensation to room temperature, ambient temperature or a temperature above 0° C.

10. A method for filling a compressed-gas container in an airbag system with a gas mixture or for producing a gas mixture in such a compressed-gas container, comprising:

introducing a gas mixture as gas or at least one gas component of the gas mixture as gas into a cooled compressed-gas container, while the compressed-gas container is moving through a cooling bath, whereby the determination and monitoring of the filling quantity of the gaseous gas or gas mixture during the filling operation takes place manometrically and whereby a conversion of at least one gas component into a cryogenically liquefied gas or a cryogenically liquefied gas mixture into the compressed-gas container is effected by condensation in the cooled compressed-gas container.

11. The method as claimed in claim 10, wherein a pressure is generated in the filled and closed compressed-gas container by warming after the compressed-gas container is removed from the cooling bath.

12. The method as claimed in claim 10, wherein after removal of the compressed gas container from the cooling bath, the warming is effected by active heating or by temperature compensation to room temperature, ambient temperature or a temperature above 0° C.

13. The method as clamed in claim 10, wherein the filling of the compressed-gas container takes place at a refrigeration temperature of at least −50° C. or below.

14. The method as claimed in claim 10, wherein the filling of the compressed-gas container takes place at a constant or substantially constant temperature.

15. The method as claimed in claim 10, wherein a measurement gas container is used.

16. The method as claimed in claim 10, wherein the compressed-gas container is filled with a gaseous gas or gas mixture by filling with at least one gaseous gas mixture that has previously been produced or by successive filling with a gaseous gas or by successive filling with at least one gaseous gas and at least one gaseous gas mixture.

17. The method as claimed in claim 10, wherein the filling of the compressed-gas container with a gas or gas mixture takes place under pressure.

18. The method as claimed in claim 11, wherein the warming is effected by active heating or by temperature compensation to room temperature, ambient temperature or a temperature above 0° C.

\* \* \* \* \*